March 28, 1961
T. J. POPE
2,977,572
HYDROPHONE
Filed Dec. 12, 1951
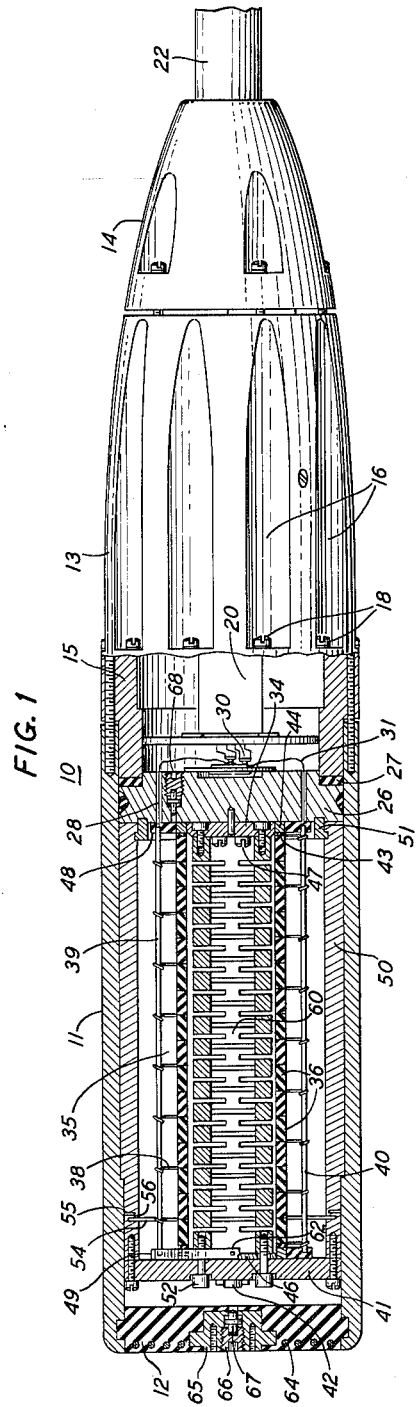
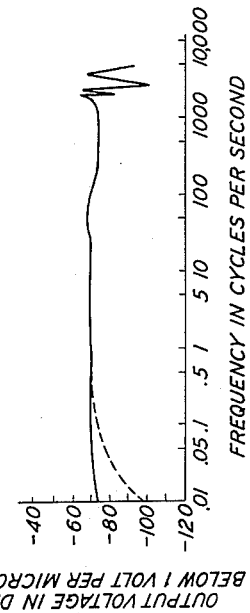
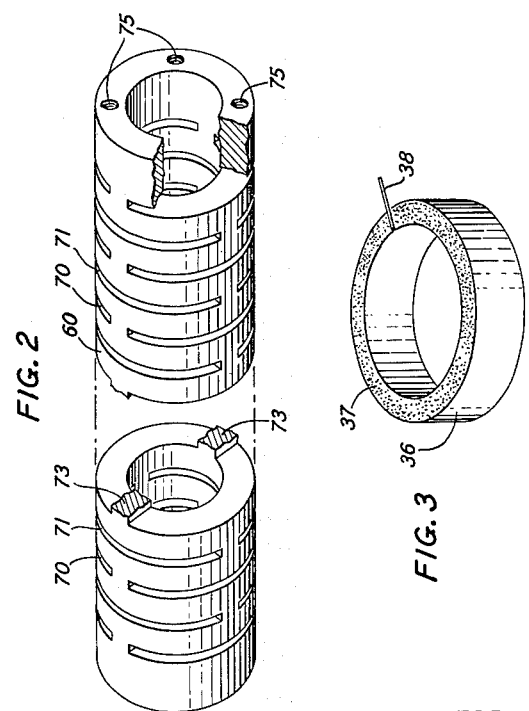
INVENTOR
T. J. POPE
BY
D. MacKenzie
AGENT United States Patent Office 2,977,572
Patented Mar. 28, 1961

2,977,572

HYDROPHONE

Thomas J. Pope, East Orange, N.J., assignor to Bell Telephone Laboratories, Incorporated, New York, N.Y., a corporation of New York Filed Dec. 12, 1951, Ser. No. 261,309

8 Claims. (Cl. 340—10)

This invention relates to acoustic translating devices, specifically an improved hydrophone uniformly responsive over a wide range of frequencies and capable of successful operation at great depths in water.

A general object of the invention is to provide an improved hydrophone.

Hydrophones of various designs have long been known but those of the prior art have been limited to moderate depths of satisfactory operation and to narrow frequency ranges. Mechanical and electrical difficulties have interferred with their performance and diminished their usefulness in submarine signals and deep sea exploration.

Another general object of the invention is to facilitate the reception and translation into electrical terms of compressional waves in water at several thousand feet below the surface as well as at lesser depths.

The frequency response characteristic of the hydrophone of the present invention is substantially flat, from one one-hundredth of a cycle to more than two thousand cycles per second. Thus, another object of the invention is to provide a hydrophone capable of uniform response to compressional waves of frequencies extending over a range of many octaves.

The invention makes use of the electrostrictive property possessed by many different substances, in particular barium titanate, and employs that property in a novel arrangement of elements devised to insure the most advantageous adjustment of sensitivity of response, range in magnitude and in frequency of received acoustic signals, stability and simplicity of manufacture.

A specific object of the invention is, therefore, to provide an improved hydrophone capable of receiving and translating, without distortion, acoustic pressures varying widely in frequency and in amplitude.

A feature of the invention is a novel arrangement of apparatus for providing initial mechanical biasing of the electrostrictive substance. This includes a spring element of novel form which enables application to the element of a mechanical biasing force of several hundred pounds.

A specific object of the invention is thus to provide an electrostrictive transducer including a novel form of biasing spring.

There is provided oil damping of the motion of a pressure-responsive diaphragm which transmits the received signal to the electrostrictive element and in addition the diaphragm is provided with a novel form of mechanical compliance, which, taken with other mechanical features, prescribes the frequency of resonance of the transducer as a whole. This compliance in the form here used is termed "peripheral compliance" and is not limited in usefulness to the exact structure which it here takes part in controlling. The provision of such compliance forms another object of the invention.

The invention will be understood from the following description thereof, referring to the accompanying drawing, in which:

Fig. 1 is a longitudinal view, partly in section and partly broken away, of the complete hydrophone;

Fig. 2 is a perspective showing of the biasing spring;

Fig. 3 is a perspective view of a barium titanate ring used in the structure of Fig. 1; and Fig. 4 is a frequency response curve of the hydrophone.

Referring to Fig. 1, hydrophone 10 comprises a cylindrical brass casing 11 closed at its forward end by a butyl rubber window 12 and receiving at the other end a brass member 13 rearwardly streamlined to receive a third or cap member 14 also of brass. Member 13 is reduced in diameter at 15 to enter casing 11 and is provided with flutes 16 to receive bolts 18 securing casing 11 to member 13. A similar shape is given member 14 which is similarly secured to member 13.

Within member 13 is housed an amplifier 20 of which the output is taken through a gland in member 14 to cable 22 leading to the observing station, say, at the water's surface. Both amplifier and gland are of conventional design and detailed description thereof is unnecessary. The amplifier output terminals are connected to cable 22 in a space (not shown) in member 14 filled with "Vistac" oil to withstand the inward pressure of sea water on the cable.

Within casing 11 and adjacent the forward end of member 13 is a bronze block 26. A shoulder at the rearward side of the block enables a reduced diameter of the latter to fit snugly within member 13 and seats against a rubber gasket 27. Passing through block 26 with suitable insulation are connectors 31 between input terminals 30 of amplifier 20 and the output terminals of the electrostrictive transducer 35 in casing 11.

Transducer 35, in the specific embodiment shown in Fig. 1, comprises a plurality of rings of electrostrictive material, specifically, sixteen rings of barium titanate including a four percent (about) admixture of lead titanate, as described in the application of W. P. Mason, Serial No. 82,120, filed March 18, 1949, now abandoned, "Electrostrictive Ceramics and Transducers." These rings are preliminarily polarized in the thickness mode, that is, in alignment with the axes of the rings, by a potential of ten thousand volts per centimeter, the direction of the polarizing force being from right to left in Fig. 1. The rings are plated with conducting material, for example silver or indium, to which laterally extending electrodes 38 are attached on both upper and lower surfaces; they are stacked as in Fig. 1 and are connected in parallel by rods 39, 40 bearing respectively eight and nine electrodes and connected through channels 28 in block 26 to input terminals 30 of amplifier 20.

Rings 36 are stacked as shown in Fig. 1 and are surmounted by the diaphragm cap 41. The diaphragm cap is of aluminum and at two diametrically opposite places is pierced for the installation of pressure relief valves, the head of one of which is indicated at 42. These valves are of a common form, comprising each a ball and spring, oppositely functioning and operated by pressures above a selected minimum, for example, ten pounds per square inch.

Suitably doweled and secured by bolts 47 to block 26 is a brass plate 34 against which bears cylindrical steel biasing spring 60 to be described in connection with Fig. 2. At each end the stack of rings 36 abuts a steatite ring 43 separating the stack from a brass ring 44. At one end, rings 43 and 44 encircle plate 34; at the other end of the stack their counterparts encircle a thinner brass plate 46 which lies next to the cap 41. Rods 39 and 40 are positioned in "Bakelite" ears 48, 49 secured at each end of the stack and on each side thereof outside rings 43 and 44.

Within casing 11 is snugly fitted brass cylinder 50, with an external shoulder abutting an internal shoulder of casing 11, and secured to block 26 by a split collar 51 bolted to the block. Diaphragm cap 41 which contains the pressure relief valves is near its periphery bolted to the forward end of cylinder 50. To the rear of bolts 52 cylinder 50 is scored internally at 54 and externally at 55. These scores extend radially to within a short distance of the outer and inner surface, respectively, of cylinder 50. They include between them an axially flexible lip 56. The diaphragm of the hydrophone is constituted of cap 41 and the portion of cylinder 50 forward of the internal score 54 and is compliantly mounted through lip 56 (8 mils thick) on the portion of cylinder 50 to the rear of external score 55. The "peripheral compliance" earlier referred to is the axial flexibility of lip 56.

Spring 60 is axially extensible and is extended by four bolts 52, two being shown in Fig. 1, which pass through cap 41 to be threaded into holes in the forward end of the spring. The initial length of spring 60 is slightly less than the distance between the opposed surfaces of plates 34 and 46 so that bolts 52 apply to the spring the tension of several hundred pounds when the clearance is fully closed, there being at plate 34 corresponding bolts by which the rearward end of the spring is anchored. This tension is an equal compression of the stack of rings 36, the steatite rings at each end of the stack serving as insulating cushions. A series of perforations, one shown at 62, permits conduction between the space within and that outside of the assembly of barium titanate rings.

Protection against incidental blows when the hydrophone is submerged is provided by a spiral spring 64 which is included within butyl rubber window 12 near its outer surface. Window 12 is further provided with a central metallic insert 65 which includes a filling hole 66 closed by pin 67. A similar hole and pin are provided in block 26 at 68. Before member 13 is bolted to casing 11, the space within that casing is evacuated at 68 and refilled with silicon oil drawn under a pressure greater than atmospheric through hole 66. In this operation, one of the pressure relief valves opens and the entire unoccupied volume within casing 11 is filled with oil. Closure of holes 66 and 68 leaves the oil at a pressure sufficient slightly to bow out window 12. The silicon oil, having a compressibility some two-thirds that of water, serves as a means of equalizing hydrostatic pressures on the two sides of diaphragm 41 without increasing appreciably the stiffness of the vibratory system.

As the hydrophone is lowered beneath the water's surface, the initially outward bulging of window 12 is reduced and at great depths eventually reversed so that by reason of the operation of the pressure relief valves, flow of the oil in one direction or the other through perforations 62 continuously protects the diaphragm against static deformation and maintains its response to compressional waves superimposed on the constant or slowly varying static pressure.

The hydrophone of Fig. 1 possesses a response characteristic substantially independent of ambient fluid pressure whether air or water. Fig. 1 is drawn substantially to scale. The hydrophone is some twenty inches long overall and four inches in diameter. The assembly when filled with oil weighs approximately forty pounds. Electrically, the stack of barium titanate rings connected in parallel has a capacity of about 7,000 micromicrofarads.

Amplifier 20 is designed with sufficient gain to furnish an output voltage, even for an acoustic pressure of only one-third microbar incident on the diaphragm, to override the noise arising in the cable and the succeeding amplifiers. The input circuit is provided with low and high frequency cut-off networks, the former to prevent overload by long period ocean swells, the latter to offset a longitudinal resonance in stack 36. The over-all response of diaphragm, crystal stack and amplifier is about one-third millivolt per microbar acoustic pressure.

It will be noted that the area of the diaphragm greatly exceeds that of the crystal surface driven by it, so that despite the force required to compress the oil, there is a gain of eight decibels in sensitivity over the crystals alone.

Fig. 2 shows spring 60 to an enlarged scale. The spring is broken midway of the figure, the better to show the nearly semicircumferential slots 70, 71 alternating lengthwise of the spring. A transverse break is made at one of slots 70. It will be seen that to form a slot, the metal of the steel tube is cut away in a plane at right angles to the axis of the tube and on both sides of a diameter of the cross section, leaving a sector 73 undisturbed at each end of that diameter. Slots 70 are cut in transverse planes at intervals along the length of spring 60; slots 71 alternate with slots 70 and are cut on each side of a diameter at right angles to the diameter of sectors 73. Uncut portions of the tube are left at each end and in these are drilled and tapped holes such as 75. Holes 75 are on diameters midway between the diameters of the families of slots and enable the spring to be fastened to plate 34 as similar holes permit bolts 52 to secure the other end of the spring to diaphragm 41.

Spring 60 is thus provided with longitudinal compliance along two planes at right angles to each other. The simultaneous stretching of spring 60 and compression of stack 36 provide the initial static mechanical bias of the crystal rings and maintain it in spite of temperature changes so that the electrostrictive response is a constant voltage (eliminated by the circuit of amplifier 20) on which is superimposed modulation of this voltage produced by the acoustic pressure on diaphragm 41.

One of rings 36 is shown in Fig. 3. Coating 37 on each end surface may be a plating of silver or of indium. If of silver, the coatings of adjacent rings are soldered together with suitable leads 38 at each junction; if of indium, the adjacent coatings are cemented together with platinum leads.

In Fig. 4 the frequency response of the complete instrument is shown, in full line without the low frequency cut-off. The dashed line at the low frequency end of the curve exhibits the effect of the low frequency cut-off in the amplifier input circuit. Even with this low frequency droop, the curve is substantially flat from one-half cycle to 2,000 cycles per second. At the higher frequency the joint effect of the high frequency cut-off and the longitudinal resonance of the stack limits the curve. This limit can, of course, be shifted by proper choice of mechanical parameters.

It should be noted that the tube of spring 60 may be made of any resilient material, chosen to suit the particular purpose. Damping material may be provided in association with the slotted tube itself instead of by immersing the tube in a liquid, as is preferred in the present invention where the oil serves for both damping and equalization of static pressure in front of and behind the diaphragm.

The peripheral compliance furnished by lip 56 may if desired be increased by multiplying the transverse planes at which such a lip shall be formed. The thickness of the lip may be designed for heavier duty and the scores may be packed with material of suitable viscosity to provide a tube such as cylinder 50 rigidly closed at each end and possessing a damped longitudinal resonance at a selected frequency. In other words, both spring 60 and cylinder 50 may be shock absorbers of novel form.

If there is applied a modulating voltage between terminals 31, the assembly of cylinder 50, with its end closures and the elements within it, one produces a powerful generator of compressional waves for any desired purpose.

Numerous other applications, of structures similar in principle to the transducer enclosed in casing 11, will occur to readers of the above disclosure.

What is claimed is:

1. A hydrophone comprising a housing having an aperture therein, a resilient member closing said aperture, a diaphragm opposite and spaced from said member, a cylindrical electrostrictive transducer in said housing and coupled to said diaphragm, a cylindrical support encompassing said transducer, said diaphragm extending across one end of said support, and a tubular spring encompassed by said transducer and tensioned to urge said diaphragm against said support.

2. A hydrophone as in claim 1 wherein said support is a tube provided intermediate its ends with internal and external scores in planes transverse to the axis of the tube and axially spaced a distance comparable with the axial width of the scores.

3. A hydrophone as in claim 2 wherein said spring is a second tube slotted in a plurality of planes transverse to the axis, said slots extending nearly semicircularly on each side of a diametral plane of the tube, the diametral planes of alternate slots being perpendicular to each other.

4. A hydrophone as in claim 3 wherein said support and diaphragm divide said housing into two chambers, the hydrophone comprising also a volume of oil filling both chambers, and means for equalizing static pressures on opposite faces of said diaphragm comprising pressure-responsive valve means coupling the two chambers.

5. In an electromechanical transducer the combination including a closed tubular member including a pair of oppositely disposed walls, one of said walls being compliantly mounted with respect to the remainder of said member thereby constituting a diaphragm, a spring tensioned between said walls, and a column of electrostrictive elements extending between said walls, said spring introducing an initial compressive stress in the column of electrostrictive elements through said diaphragm.

6. An electromechanical transducer comprising a tubular casing circumferentially scored externally and internally respectively in neighboring planes transverse to the casing and intermediate the ends thereof, a rigid closure at each end of the casing, an array of electrostrictive elements mounted within the casing intermediate the closures, electrical terminals connected to the array and spring means cooperating with the closures to apply longitudinal compression to the array.

7. A transducer as in claim 6 in which the array comprises a plurality of pairs of electrostrictive elements connected in parallel to the terminals and electrically polarized in a common sense.

8. A transducer as in claim 7 in which the electrostrictive elements are rings, electrically polarized in the thickness mode, of barium titanate and lead titanate mixed in the proportions of approximately 96:4, respectively.

References Cited in the file of this patent

UNITED STATES PATENTS

| | | |
|---|---|---|
| 2,171,185 | Maier | Aug. 29, 1939 |
| 2,471,296 | Allen | May 24, 1949 |
| 2,473,835 | Turner | June 21, 1949 |
| 2,529,138 | Chesney | Nov. 7, 1950 |
| 2,589,135 | Rafuse | Mar. 11, 1952 |